United States Patent
Sun et al.

(10) Patent No.: US 12,498,505 B2
(45) Date of Patent: Dec. 16, 2025

(54) MESOSCALE NONLINEAR OPTICAL GIGASCOPE SYSTEM WITH REAL-TIME GIGAPIXEL MOSAIC-STITCHING AND DIGITAL DISPLAY

(71) Applicant: NATIONAL TAIWAN UNIVERSITY, Taipei (TW)

(72) Inventors: Chi-Kuang Sun, Taipei (TW); Bhaskar Jyoti Borah, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 647 days.

(21) Appl. No.: 17/963,201

(22) Filed: Oct. 11, 2022

(65) Prior Publication Data

US 2024/0118453 A1  Apr. 11, 2024

(51) Int. Cl.
*G02B 1/00* (2006.01)

(52) U.S. Cl.
CPC .................... *G02B 1/002* (2013.01)

(58) Field of Classification Search
CPC .............. G02F 1/3501; G02F 1/3505; G02F 2001/3503; G02F 1/39; H01S 3/109; H01S 3/082; H01S 5/4062; G02B 1/002
USPC .......... 356/417, 521, 495, 497, 512
See application file for complete search history.

(56) References Cited

U.S. PATENT DOCUMENTS

| | | | |
|---|---|---|---|
| 6,769,769 B2 * | 8/2004 | Podoleanu | A61B 3/1025 356/497 |
| 7,148,492 B2 * | 12/2006 | Loney | G01N 33/58 250/459.1 |
| 7,508,524 B2 * | 3/2009 | Mahadevan-Jansen | G01B 9/0203 356/73 |
| 8,115,934 B2 * | 2/2012 | Boppart | A61B 5/0066 356/497 |
| 8,750,586 B2 * | 6/2014 | Wang | A61B 5/0066 600/479 |
| 8,878,905 B2 * | 11/2014 | Fisker | A61B 5/0068 348/46 |
| 9,400,169 B2 * | 7/2016 | Zhou | A61B 5/0066 |
| 12,001,004 B2 * | 6/2024 | Betzig | G02B 26/06 |
| 2007/0263226 A1 * | 11/2007 | Kurtz | G01N 21/4795 356/492 |
| 2011/0147615 A1 * | 6/2011 | Kintz | G02B 21/0076 359/385 |
| 2014/0218748 A1 * | 8/2014 | Wax | G01B 9/02044 356/497 |

(Continued)

*Primary Examiner* — Isiaka O Akanbi
(74) *Attorney, Agent, or Firm* — Li & Cai Intellectual Property Office

(57) ABSTRACT

A mesoscale nonlinear optical gigascope (mNLOG) system is provided to assist with rapid gigapixel resonant-raster laser-scanning and post-processing-free digital display of a centimeter-scale biological specimen in real-time. The mNLOG system enables a half-a-micron digital resolution with satisfied Nyquist-Shannon criterion while providing an aliasing-free optically-sectioned cumulative point-scanning area ranging from 1 square millimeter (mm) up-to 400 square mm. The mNLOG system is configured to perform a rapid artifact-compensated two-dimensional large-field mosaic-stitching (rac2D-LMS) process, so as to provide post-processing-free gigapixel mosaic-stitching and real-time digital display with a sustained effective data through-put of at least 500 Megabits per second (Mbps).

6 Claims, 7 Drawing Sheets

(56) References Cited

U.S. PATENT DOCUMENTS

2017/0038576 A1* 2/2017 Sasaki .................... H04N 5/265

* cited by examiner

MESOSCALE NONLINEAR OPTICAL GIGASCOPE SYSTEM WITH REAL-TIME GIGAPIXEL MOSAIC-STITCHING AND DIGITAL DISPLAY

FIELD OF THE DISCLOSURE

The present disclosure relates to a system, and more particularly to a mesoscale nonlinear optical gigascope (mNLOG) system used to provide rapid gigapixel resonant-raster laser-scanning and digital display for a centimeter-scale biological specimen in real-time.

BACKGROUND OF THE DISCLOSURE

Optically-sectioned centimeter-scale imaging is critical in various bioimaging applications, such as imaging of a whole animal brain or an ultra-large organ, imaging of an expansion microscopy sample, rapid two-dimensional (2D) histopathological imaging of an ultra-large biological specimen, etc. A high enough digital resolution is imperative to observe fine enough morphologies, such as nerve fibers, while a fast enough scanning and display speed is often expected to keep the cumulative assessment time as short as possible.

In a digital optical microscopy system, to reliably retrieve a half-a-micron optical resolution digitally, the sampling pixel size is expected to be smaller than or at least equal to 0.25 μm according to the Nyquist-Shannon sampling criterion. Considering a $1.0 \times 1.0$ mm$^2$ imaging area, a total of at least 384 M bits would be thus required where each 3-channel pixel is 24-bit in data size. Extending the requirement for a $1.0 \times 1.0$ cm$^2$ cumulative imaging area, a total of at least 38.4 G bits or 1.6 Gigapixels would be required.

It is noted that in an optical microscopy system, a high numerical aperture (NA) that is close to or greater than 1 is necessary to secure a submicron optical lateral resolution. However, a high-NA objective lens often limits the field-of-view (FOV) to less than 1 mm$^2$, which eventually mandates a series of mosaicking or stitching operations while imaging a centimeter-scale area. It is further noted that the associated stitching operations are expected to be artifact-free to not compromise with the data reliability.

Despite substantial contributions being made towards image/video or panoramic stitching techniques, feature-based sophisticated algorithms are often not suitable for a large-FOV high-pixel-rate dynamic optical microscopy in the context of post-processing-free operation, parallel implementation, distortion compensation, immunity to high-frequency noise, and especially to assist with half-a-second computational complexity for real-time stitching of Nyquist-satisfied ultra-high resolution (such as >800 M bit) imaging tiles.

Thus, one would need to perform the imaging way faster so that it becomes feasible to rapidly scan a centimeter scale area within a few tens-of-seconds while not much sacrificing either the digital resolution or the signal-to-noise ratio. In addition, all associated digital image mosaicking or stitching operations must be performed in real-time so that the cumulative imaging time remains as short as possible, and while doing so, it is also expected that the quality of mosaicking or stitching remains satisfactory.

SUMMARY OF THE DISCLOSURE

In response to the above-referenced technical inadequacies, the present disclosure presents a mesoscale nonlinear optical gigascope (mNLOG) system used to provide rapid gigapixel resonant-raster laser-scanning and digital display for a centimeter-scale biological specimen in real-time.

In one aspect, the present disclosure provides a mesoscale nonlinear optical gigascope (mNLOG) system for centimeter-scale laser-raster-scanning of a biological specimen with Nyquist-satisfied <1 micron (μm) effective digital resolution providing an aliasing-free optically-sectioned cumulative point-scanning area ranging from 1 square millimeter (mm) up-to 400 square mm, the mNLOG system being configured to perform a rapid artifact-compensated two-dimensional (2D) large-field mosaic-stitching (rac2D-LMS) approach enabling post-processing-free gigapixel mosaic-stitching and real-time digital display with a sustained effective data throughput of at least 500 Megabits per second (Mbps), and the mNLOG system includes a scanning head, a first relay system, an objective lens, a multichannel optical detection unit, a multichannel data acquisition and display unit and a motorized three-dimensional (3D) stage unit. The scanning head includes a scanning mirror and a galvanometer scanning mirror, in which the scanning mirror is optically coupled to one or more pulsed laser sources, the galvanometer scanning mirror is optically coupled to the scanning mirror, the scanning head is configured to generate a resonant scanning laser beam, and the scanning mirror is a resonant scanning mirror or a polygon scanning mirror. The first relay system includes a scan lens and a tube lens providing a magnification factor of greater than 1, in which the scan lens is optically coupled to the galvanometer scanning mirror, and the tube lens is optically coupled to the scan lens. The objective lens is optically coupled to the tube lens, wherein the objective lens is used to focus the resonant scanning laser beam over the biological specimen. The multichannel optical detection unit includes a plurality of focusing lenses, a plurality of dichroic beam splitters, and a plurality of receivers, in which one or more of nonlinear multi-harmonic generation and nonlinear multi-photon excitation fluorescence signals are collected by the plurality of receivers, respectively, through the focusing lenses and the dichroic beam splitters, and the plurality of receivers are configured to generate a plurality of electrical output signals. The multichannel data acquisition and display unit is configured to receive the plurality of electrical output signals, and the multichannel data acquisition and display unit includes a first transimpedance amplifier (TIA), a second TIA, a third TIA, a multichannel digitizer, a processing device including a computer with a central processing unit (CPU) and one or more graphics processing units (GPUs) that perform multiple C++-based algorithms stored in a memory of the computer, and a display device. The motorized 3D stage unit includes a first electronic stage, a second electronic stage, and a third linear electronic stage that are used to bear and move the biological specimen.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
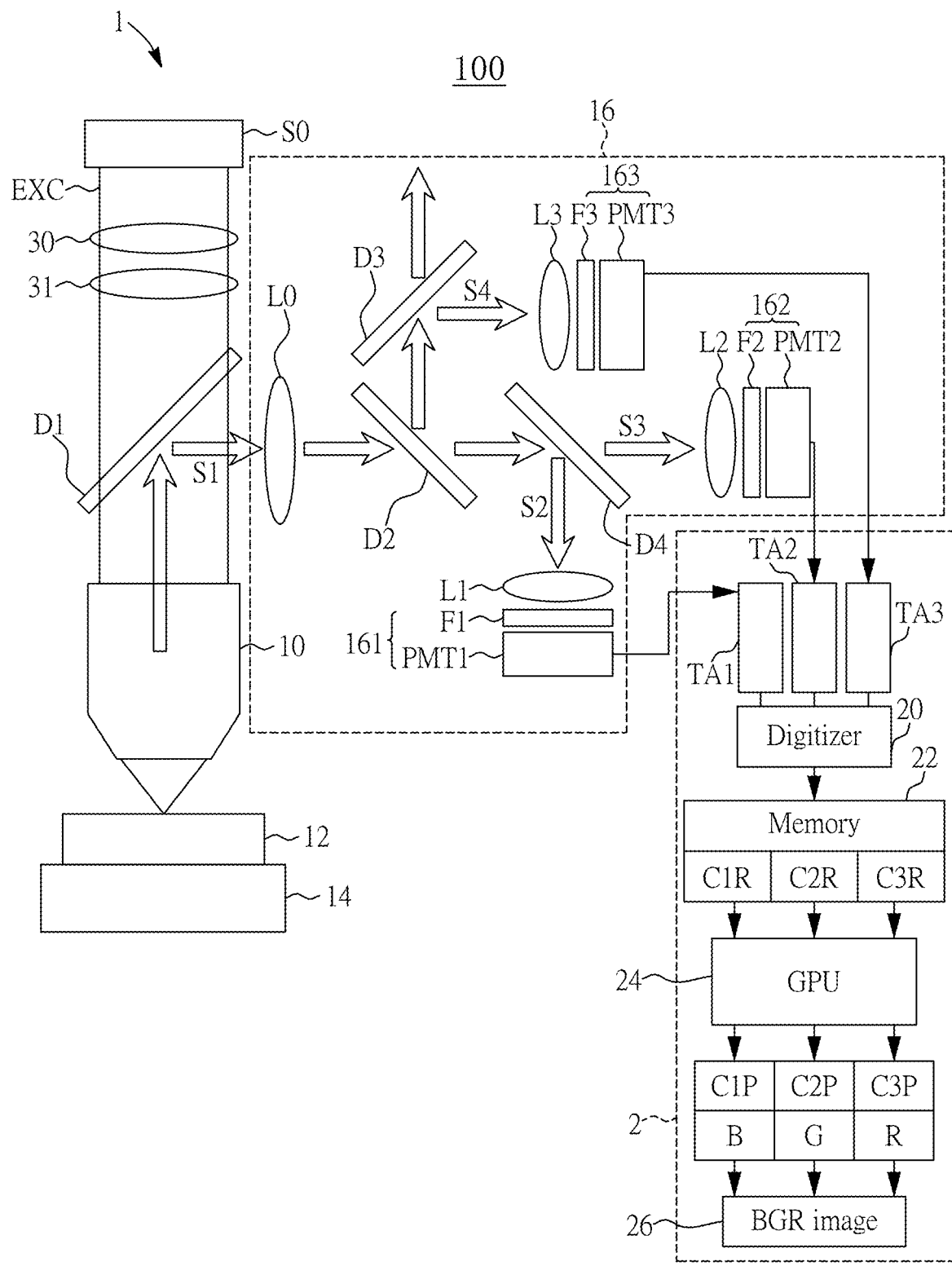
FIG. 1 is a functional block diagram of a mesoscale nonlinear optical gigascope (mNLOG) system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a functional block diagram of a mesoscale nonlinear optical gigascope (mNLOG) system according to one embodiment of the present disclosure.

Referring to FIG. 1, one embodiment of the present disclosure provides a mesoscale nonlinear optical gigascope (mNLOG) system 100, which includes a detection device 1 and a host 2. The detection device 1 includes an optical scanning unit S0, an objective lens 10, a motorized three-dimensional (3D) stage unit 14, a multichannel detection unit 16.

For example, the detection device 1 can be a basic optical detection unit. The objective lens 10 focuses a resonant-raster-scanning laser beam EXC having a predetermined central wavelength (e.g., 1070 nm) over a biological specimen 12 being placed on the motorized 3D stage unit 14, which can includes three electronic stages. A primary dichroic beam splitter D1 cut-on at a primary wavelength (e.g., 735 nm) reflects an emerging optical signal S1 to a multichannel detection unit 16 including a plurality of relay systems with focusing lenses L0, L1, L2 and L3, in which the focusing lens L0 has an effective focal length (EFL) of 150 mm, and the focusing lenses L1, L2 and L3 have an EFL of 40 mm.

For spectral separations, dichroic beam splitters D2, D3 and D4 are utilized, and have a plurality of cut-on wavelengths, which can be, for example, 505 nm, 473 nm, and 560 nm, respectively.

Specifically, one or more of nonlinear multi-harmonic generation and nonlinear multi-photon excitation fluorescence signals can be collected by multiple receivers, respectively, through the focusing lenses and the dichroic beam splitters mentioned above. For example, with a 1070 nm central excitation wavelength, the dichroic beam splitter D4 can be used to reflect a second harmonic generation (SHG) signal S2 to a photomultiplier tube PMT1 of a first receiver 161, and to transmit a two-photon excitation fluorescence (TPEF) signal S3 to a photomultiplier tube PMT 2 of a second receiver 162. The dichroic beam splitters D2 and D3 assist in collecting a third harmonic generation (THG) signal S4 at a photomultiplier tube PMT3 of a third receiver 163. It should be noted that each receiver can include at least one band-pass filter and at least one photomultiplier tube, but the present disclosure is not limited thereto.

For example, band-pass filters F1, F2 and F3 are configured to assist in confirming that a specific optical signal of interest is received. Transimpedance amplifiers TA1, TA2 and TA3 are configured to amplify electrical output signals from the photomultiplier tubes PMT1, PMT2 and PMT3, respectively.

Furthermore, the host 2 can be a multichannel data acquisition and display unit that includes the transimpedance amplifiers TA1, TA2, TA3, the multichannel digitizer 20, a processing device and a display device. The processing device can include a computer with a central processing unit (CPU) and one or more graphics processing units that perform multiple C++-based algorithms stored in a memory of the computer. In one embodiment of the present disclosure, the host 2 is connected to the multichannel detection unit 16, and includes a digitizer 20, a host memory 22, a graphic processing unit (GPU) 24 and GPU buffers C1P-C3P. The amplified output signals from the first receiver 161, the second receiver 162 and the third receiver 163 can be digitized by the digitizer 20. The host memory 22 includes a plurality of available host buffers C1R-C3R for the 3-channel digitized data. C1R-C3R are uploaded to the GPU 24.

However, the aforementioned details are disclosed for exemplary purposes only, and are not meant to limit the scope of the present disclosure.

Figure 2:
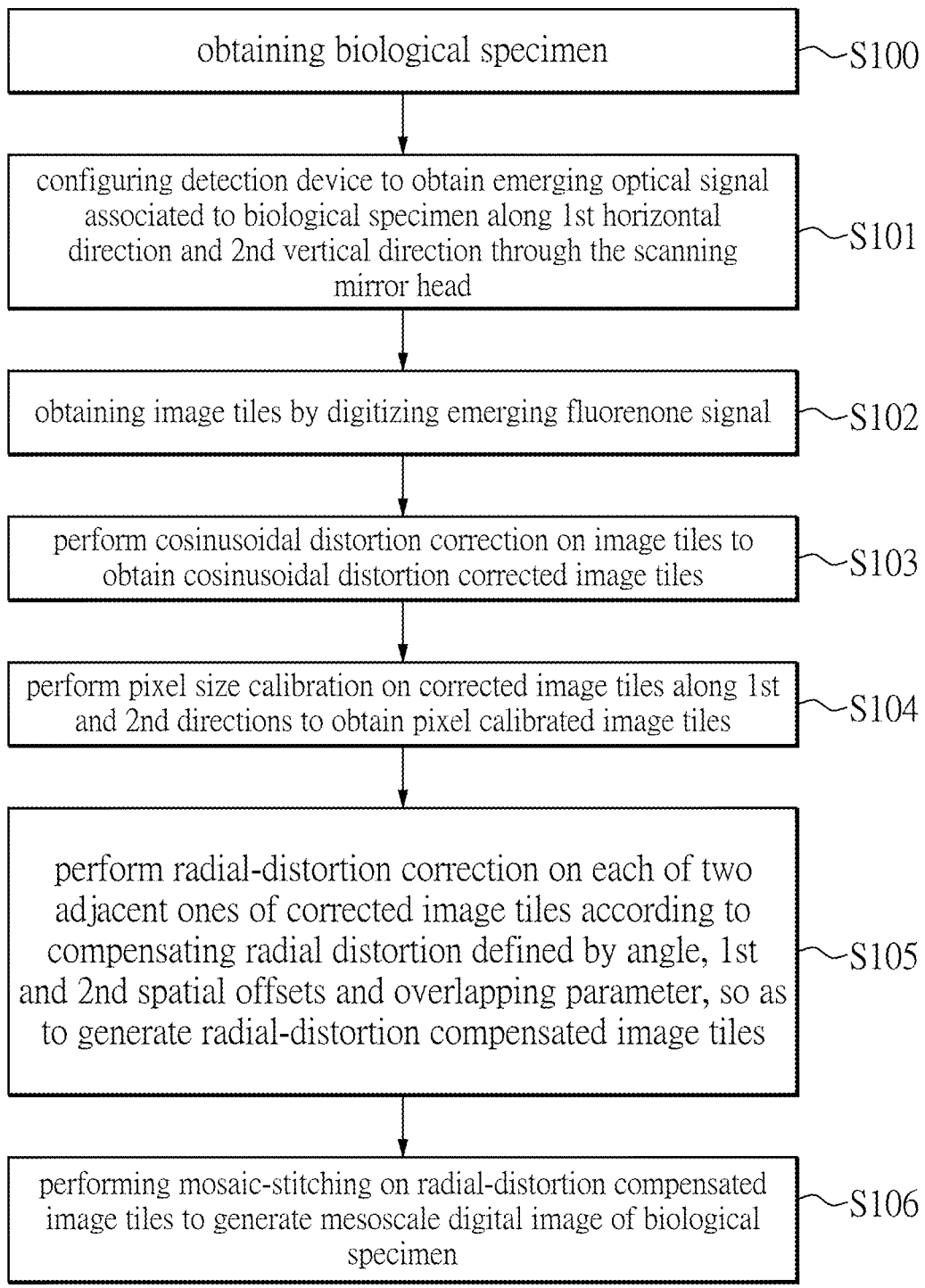
FIG. 2 is a flowchart of an mNLOG operation according to one embodiment of the present disclosure.

Reference can be made to FIG. 2, which is a flowchart of an mNLOG operation according to one embodiment of the present disclosure.

Specifically, the present disclosure provides a mesoscale nonlinear optical gigascope system 100 of FIG. 1 based on nonlinear optics to provide rapid gigapixel resonant-raster laser-scanning and digital display of a centimeter-scale biological specimen in real-time, but the present is not limited thereto. As shown in FIG. 2, the mesoscale nonlinear optical gigascope system 100 of FIG. 1 can be configured to perform the mNLOG operation, which includes the following steps:

Step S100: obtaining a biological specimen. It is noted that securing a high contrast and high signal-to-background ratio without any signal accumulation especially in an unstained biological specimen is often challenging, and thus staining the biological specimen with one or more relevant dyes, such as Hematoxylin and Eosin (H&E) in case of a histopathological imaging application, can help improve the image fidelity.

Next, the mNLOG operation proceeds to step S101: configuring the detection device to obtain an emerging optical signal associated to the biological specimen along a first horizontal direction and a second vertical direction through the optical scanning unit S0 comprising a scanning head optically coupled to one or more pulsed laser sources. The scanning head includes a resonant scanning mirror or a polygon scanning mirror that is optically coupled to a galvanometer scanning mirror.

As depicted in FIG. 1, the motorized 3D stage unit 14 can include three electronic stages and can be used to bear and move the biological specimen 12, along the first horizontal direction and the second vertical direction (e.g., X and Y axes, respectively). The optical scanning unit S0 that includes a scanning head optically coupled to one or more pulsed laser sources is followed by the relay system consisting of a scan lens 30 and a tube lens 31, which can provide the resonant scanning laser beam EXC, and can provide a high magnification factor that is greater than 1. The objective lens 10 can be utilized for focusing the resonant scanning laser beam over the biological specimen 12, and can be provided with a numerical aperture (NA) that is greater than or close to 1.0. In addition, the scan lens 30 can be optically coupled to the galvanometer scanning mirror, and the tube lens 31 can be optically coupled to the scan lens 30 and the objective lens 10.

The primary dichroic beam splitter D1 disposed between the objective lens 10 and the optical scanning unit S0 can reflect the emerging optical signal S1 from the biological specimen 12. Afterward, through the dichroic beam splitters and the focusing lenses, multiple optically separated signals S2, S3 and S4 of the emerging optical signal S1 can be collected by the receivers 161, 162 and 163, respectively.

Moreover, in the mesoscale nonlinear optical gigascope system 100 provided by the present disclosure, the host 2 can be configured to provide a rapid artifact-compensated two-dimensional (2D) large-field mosaic-stitching (rac2D-LMS) process while performing the following steps:

Step S102: obtaining a plurality of image tiles by digitizing the emerging optical signal. It should be noted that the method provided by the present disclosure requires at least two adjacent tiles with a non-zero overlap as inputs to estimate a compensating distortion. In some embodiments, the overlapping regions of the two adjacent tiles are expected to show up enough identical structural details.

Step S103: perform a cosinusoidal distortion correction on the plurality of image tiles to obtain a plurality of cosinusoidal distortion corrected image tiles. Specifically, the cosinusoidal distortion correction is required owing to a nonlinear speed profile of a resonant scanner.

Step S104: perform a pixel size calibration on the plurality of cosinusoidal distortion corrected image tiles along the first horizontal direction and the second vertical direction to obtain a plurality of pixel calibrated image tiles. For example, a basic pixel size calibration can be performed to make a pixel uniform along both X- and Y-axes.

Step S105: perform a radial-distortion compensation on each of two adjacent ones of the plurality of pixel calibrated image tiles according to a compensating radial-distortion defined by an angle, a first spatial offset, a second spatial offset and an overlapping parameter, so as to generate a plurality of radial-distortion compensated image tiles.

Figure 3:
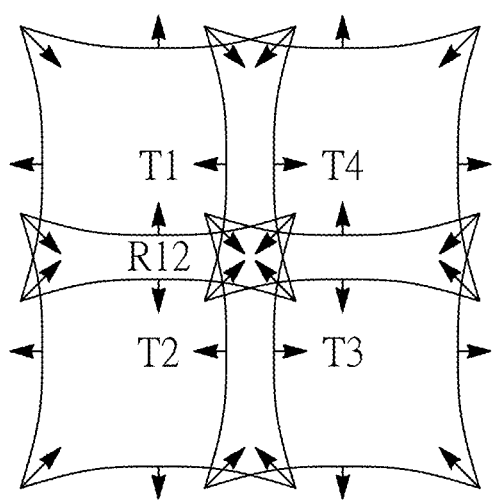
FIG. 3 is a schematic diagram illustrating a basic idea of the radial-distortion compensation according to one embodiment of the present disclosure.

Reference can be further made to FIG. 3, which is a schematic diagram illustrating steps of the radial-distortion compensation according to one embodiment of the present disclosure.

As shown in FIG. 3, a core idea is to introduce an appropriate opposite radial-distortion to each tile following a field of view (FOV) distortion model. For instance, if an FOV is affected by a positive (i.e., pincushion) radial-distortion, a suitable negative (i.e., barrel) radial-distortion can be applied, such that a resultant FOV becomes distortion-free, and thus overlapping regions in two adjacent tiles become identical to assist with an artifact-free mosaic-stitching which is performed afterward. It should be noted that the compensating distortion needs to be estimated only one time for a specific system configuration provided by the present disclosure. Once the compensating distortion is estimated, corrected pixel coordinate maps can be pre-calculated to enable a near instantaneous distortion compensation.

To one-time assess the compensating radial-distortion, a brute-forced process is provided as depicted in FIG. 3, where two adjacent overlapping image tiles T1 and T2 are provided as input image tiles. Each tile is first converted to 8-bit grayscale format. To make the algorithm less susceptible to high-frequency noise, a morphological opening operation is performed to each input tile. Subsequently, a binary thresholding is applied. To regulate the distortion effect, three parameters are utilized, which are an angle (A, in degrees) governing the extent of distortion, and two spatial offsets ($X_{off}$ and $Y_{off}$) effecting the symmetry of distortion. For each case of A, $X_{off}$ and $Y_{off}$, each parameter within a specified range, opposite distortion induced output image tiles $T1^U$ and $T2^U$ can be obtained.

Based on a sum of absolute differences for all pixels within an overlapping region of interest R12 in FIG. 2, an assessment parameter $d_k$ is evaluated for each case. Finally, values of A, $X_{off}$ and $Y_{off}$ are set fixed corresponding to a minimum-$d_k$ case.

For a mathematical illustration, in the present embodiment, an input image $I_D(x, y)$ with C×R pixels is assumed. Firstly, two 2D arrays are defined as:

$$F_x(x, y) = \begin{pmatrix} 0 & \cdots & C-1 \\ \vdots & \ddots & \vdots \\ 0 & \cdots & C-1 \end{pmatrix}_{C \times R} \text{ and}$$

$$F_y(x, y) = \begin{pmatrix} 0 & \cdots & 0 \\ \vdots & \ddots & \vdots \\ R-1 & \cdots & R-1 \end{pmatrix}_{C \times R};$$

then a first spatial scaling factor $S_x$ and a second spatial scaling factor $S_y$ are defined, and the following equations according to a field of view (FOV) distortion model can be obtained:

$$r_d(x, y) = \frac{360}{A\pi} \tan^{-1}\left[2r_u(x, y)\tan\frac{A\pi}{720}\right];$$

-continued where $r_u(x, y) = \sqrt{r_x(x, y)^2 + r_y(x, y)^2}$, $r_x(x, y) = \dfrac{1}{c_1}(F_x(x, y) - c_1)$, $r_y(x, y) = \dfrac{1}{c_2}(F_y(x, y) - c_2)$, $c_1 = 0.5C(1.0 + X_{off}/S_x)$, and $c_2 = 0.5C(1.0 + Y_{off}/S_y)$.

Next, a multiplicative factor f(x, y) is defined as $r_u(x,y)/r_d(x, y)$ in case of a pincushion distortion, or as $r_d(x,y)/r_u(x,y)$ in case of a barrel distortion. Subsequently, two pixel-coordinate maps $M_x(x,y)$ and $M_y(x,y)$ for the first horizontal direction (X axis) and the second vertical direction (Y axis), respectively, are obtained as $M_x(x,y) = C_1[1 + r_x(x,y)f(x,y)]$; and $M_y(x,y) = C_2[1 + r_y(x,y)f(x,y)]$.

Pixel remapping as per the above maps are performed for both adjacent image tiles T1 and T2, and the resultant images are obtained as the output image tiles $T1^U$ and $T2^U$, respectively. For an estimated overlapping region of interest (ROI) $R_{12}$, the assessment parameter $d_k$ is defined as:

$$d_k = \dfrac{\sum_{All\ R12\ pixels} |T1^U - T2^U|}{\text{Area}(R_{12})};$$

where k denotes each individual case. It should be noted that the distortion effect needs to be applied to all 4 quadrants of the adjacent image tiles. Therefore, the two adjacent overlapping image tiles T1 and T2 can be flipped along the first horizontal direction, the second vertical direction, and the first horizontal and the second vertical directions to obtain a first pair of flipping image tiles, a second pair of flipping image tiles, and a third pair of flipping image tiles. For example, the adjacent image tiles T1 and T2 are flipped along the X axis, the Y axis, and both the X and Y axes, and the pixel remapping operations are repeated based on the same two pixel-coordinate maps $M_x(x, y)$ and $M_y(x, y)$, and the associated assessment parameter d k can be calculated for each case. Finally, following the minimum-$d_k$ case, the corresponding A, $X_{off}$ and $Y_{off}$ can then be obtained. Noted that $X_{off}$ or $Y_{off}$ is set negative, if involving a flipping operation.

Figure 4:
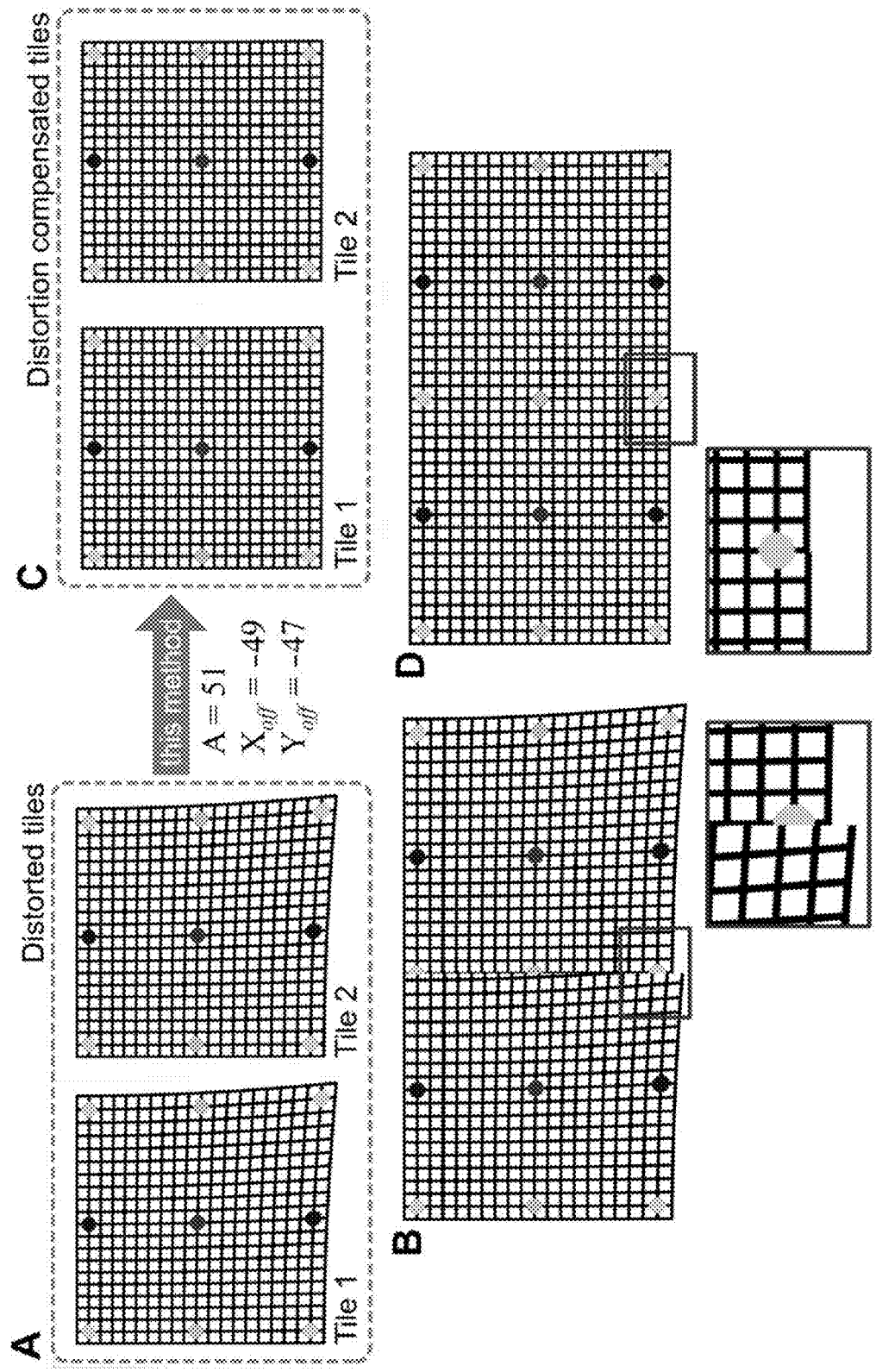
FIG. 4 illustrates the radial-distortion compensation through simulated grid images according to one embodiment of the present disclosure.

Reference is made to FIG. 4, which illustrates the radial-distortion compensation through simulated grid images according to one embodiment of the present disclosure. To test the method, a grid image is simulated where an asymmetric radial-distortion is induced. In part A of FIG. 4, two of such identically distorted tiles are shown. In part B of FIG. 4, a straightforward mosaic-stitching is depicted, where a marked ROI indicates a severe structural artifact or discontinuity. The image tiles in the part A are now processed with the radial-distortion compensation provided by the present disclosure, and the distortion parameters A, $X_{off}$ and $Y_{off}$ are assessed.

The radial-distortion compensated image tiles $T1^U$ and $T2^U$ are depicted in part C of FIG. 4. Curved lines in the distorted tiles essentially become straight after the distortion compensation provided by the present disclosure. Part D shows a mosaic-stitched result with the radial-distortion compensated image tiles, where the marked ROI reveals a near artifact-free nature.

To one-time estimate the distortion parameters A, $X_{off}$ and $Y_{off}$ provided by the present disclosure, a typical hematoxylin and eosin (H&E)-stained tissue sample is imaged, and the third harmonic generation (THG) signal S4 and the two-photon excitation fluorescence (TPEF) signal S3 are collected from hematoxylin and eosin dyes, respectively. Then, the distortion parameters are estimated for two sets of vertically and horizontally acquired adjacent image tiles as being depicted in Table II provided below:

TABLE II

| Tests | Vertically acquired tiles | | | Horizontally acquired tiles | | |
|---|---|---|---|---|---|---|
| | A | $X_{off}$ | $Y_{off}$ | A | $X_{off}$ | $Y_{off}$ |
| 1 | 25° | 7 | 19 | 27° | 5 | 17 |
| 2 | 25° | 5 | 20 | 24° | 6 | 20 |
| 3 | 25° | 7 | 23 | 25° | 6 | 21 |

According to Table II, each set consists of 4 continuous image tiles, and thus provides 3 overlapping regions. The average values of A, $X_{off}$ and $Y_{off}$ are found to be 25.2°, 6.0, and 20.0, respectively. Furthermore, the two pixel-coordinate maps $M_x(x,y)$ and $M_y(x, y)$ can be pre-calculated and fixed.

Reference can be made back to FIG. 1, the processed data of the host buffers C1R-C3R are now obtained as image data C1P-C3P, respectively. Designating pseudo colors to each channel, the image data C1P-C3P are merged into a BGR image 26.

Once the BGR image 26 is ready, the same gets queued to the pre-allocated GPU buffers. While an acquisition continues, the buffers get occupied by distortion corrected BGR image tiles $T1^U$, $T2^U$, and so on. Each queued tile is sequentially processed and aligned in real-time to facilitate a post-processing-free automatic mosaic-stitching.

Next, the rac2D-LMS process proceeds to step S106: performing a mosaic-stitching on the plurality of radial-distortion compensated image tiles to generate a mesoscale digital image of the biological specimen. The mesoscale digital image can be display on the display device 21 of the host 2 shown in FIG. 2.

Figure 5:
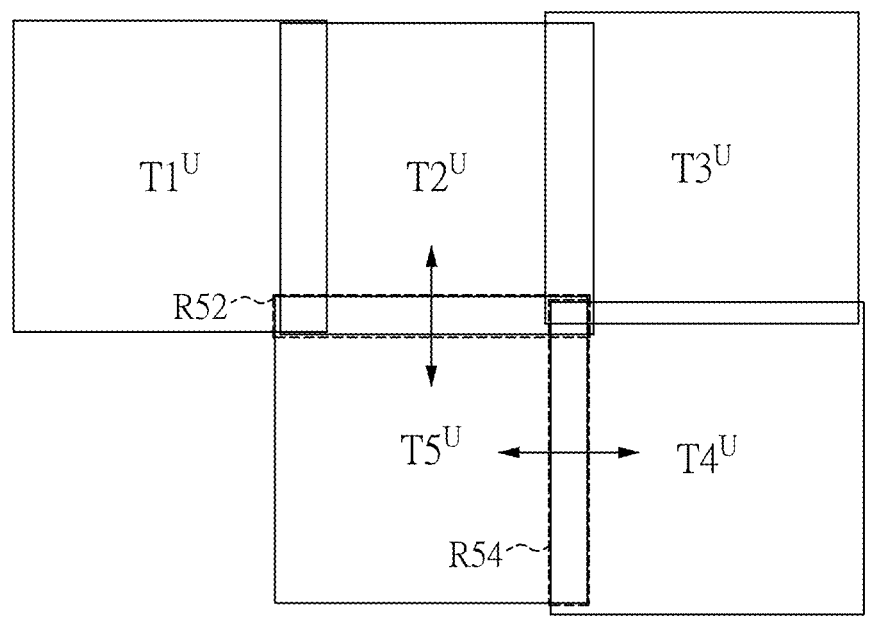
FIG. 5 shows a basic idea of the mosaic-stitching according to one embodiment of the present disclosure.

Reference can be made to FIG. 5, which shows a basic idea of the mosaic-stitching according to one embodiment of the present disclosure. As shown in FIG. 5, a to-be-aligned image tile $T5^U$ is to be aligned to the existing image tiles $T1^U$-$T4^U$. Firstly, one or more major overlapping regions of interest (ROIs) are identified, for example, overlapping regions R54 and R52 in this case.

It is noted that coordinates of the existing image tile $T4^U$ and $T2^U$, and the extents of overlap, i.e., widths of R54 and R52 can be estimated based on linear motion of the motorized 3D stage unit 14. Based on the estimation, to-be-aligned image tile $T5^U$ is slid along both the X and Y axes, so as to assess the major overlapping ROIs R54 and R52 to choose the best matching condition.

To make the process faster, a coarse mode is utilized, where a first predetermined pixel-step (e.g., 10) is employed while sliding. Once an acceptable solution is found, a fine-tuning is executed with a second predetermined pixel-step (e.g., 2) near the coarse-estimated solution, and the first predetermined pixel-step is larger than the second predetermined pixel-step.

The following descriptions provide a mathematical illustration of the mosaic-stitching utilized in the present disclosure. RangeY and RangeX stand for sliding ranges along the Y and X axes, respectively. Based on linear stage motion, an overlap $X_{OV}$ (i.e., width of R54) can be estimated. Another alignment parameter $Y_{AL}$ is defined to address an off-axis deviation between the to-be-aligned image tile $T5^U$ and the existing image tile $T4^U$. If the to-be-aligned image tile $T5^U$ is vertical to the existing image tile, the overlap and alignment parameters would be $Y_{OV}$ and $X_{AL}$, respectively.

For the coarse mode evaluation, $Y_{AL}$ is initially presumed to be zero, and RangeY is defined to be −70 to +70. Likewise, RangeX is defined to be $X_{OV}$−100 to $X_{OV}$+100. Following a step of 10 pixels, the to-be-aligned image tile $T5^U$ is slid along the X and Y axes. For each case of $X_{OV}$ and $Y_{AL}$, the major overlapping ROIs R54 (primary) and R52 (secondary) can be detected. R54-ROIs extracted from the to-be-aligned image tile $T5^U$ and the existing image tile $T4^U$ are being denoted as $T5_{R54}^U(r,c)$ and $T4_{R54}^U(r,c)$, respectively, each with R×C pixels. A 2×downscaling is applied thereafter.

A per-pixel absolute difference $d^A(r'',c'')$ is calculated for all pixels in R54 as represented in the following equation:

$$d^A(r'',c'') = |T5_{R54}^U(r,c) - T4_{R54}^U(r,c)|$$

Note that R and C are number of rows and columns, respectively; and r and c respectively denote vertical and horizontal pixel coordinates.

Similar process is repeated for $T5_{R52}^U(r',c')$ and $T2_{R52}^U(r',c')$ for R52 (provided a secondary major overlap exists) and a per-pixel absolute difference $d^B(r''',c''')$ is obtained.

Now, standard deviations $\sigma^A$ and $\sigma^B$ are calculated for $d^A(r'',c'')$ and $d^B(r''',c''')$, respectively, and a sum $\sigma^k$ is obtained by adding $\sigma^A$ and $\sigma^B$. Note that $\sigma^B$ would be zero if there is no secondary major overlap.

Once coarse sliding is over, all cases of $X_{OV}$ and $Y_{AL}$ are considered. Therefore, the maximum and minimum values of σ can be found, and if the difference is found to be higher than a pre-defined threshold, the fine-tuning can be executed. In the fine-tuning, the $X_{OV}$ and $Y_{AL}$ values corresponding to the minimum-σ case are used, and RangeX and RangeY are defined as $X_{OV}$−10 to $X_{OV}$+10 and $Y_{AL}$−10 to $Y_{AL}$+10, respectively. Subsequently, following a reduced step of 2 pixels, the above sliding process is repeated, and thus $X_{OV}$ and $Y_{AL}$ are finalized.

Figure 6:
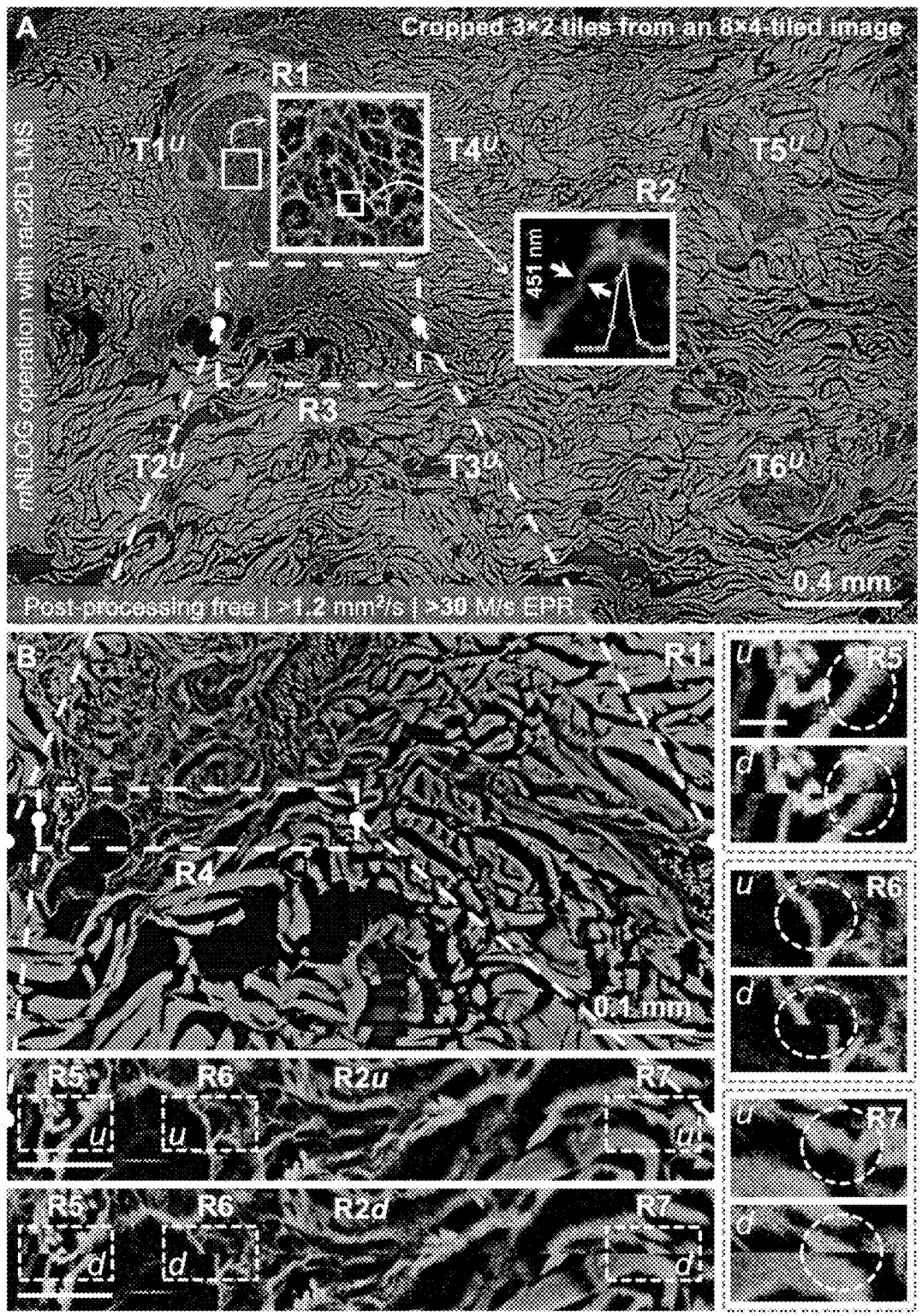
FIG. 6 depicts a mosaic-stitched view of 3×2 tiles revealing a submicron digital resolution and an artifact-compensated mosaic-stitching nature according to one embodiment of the present disclosure.

Reference can be made to A part of FIG. 6, which depicts a mosaic-stitched view of 3×2 tiles (being cropped from an ultra-large 8×4 tiled image) acquired with the mesoscale nonlinear optical gigascope system according to one embodiment of the present disclosure. A typical histopathology slide stained with standard hematoxylin and eosin dyes was used as imaging sample. $T1^U$-$T6^U$ denote radial-distortion compensated tiles. Each 1.1×1.1 mm² tile consists of 6000×6000 pixels. Green and red colors stand for TPEF signal from eosin and THG signal from hematoxylin, respectively. An ROI R1 is enlarged containing fine fiber structures. An ROI R2 is again selected inside the ROI R1, and the magnified view is depicted alongside. A 451 nm-thick ultrafine structure is digitally retrieved.

Reference can be made to B part of FIG. 6 wherein a 4-tile joining region ROI R3 (from A part) is enlarged. An ROI R4 marked in the B part is again magnified considering both undistorted (R2u) and distorted (R2d) cases. For better visualization, three ROIs R5, R6 and R7 are marked and enlarged alongside. White circled regions in each case validate an artifact-free mosaic-stitching nature, wherein u (undistorted) and d (distorted) respectively denote after- and before-compensation scenarios.

Figure 7:
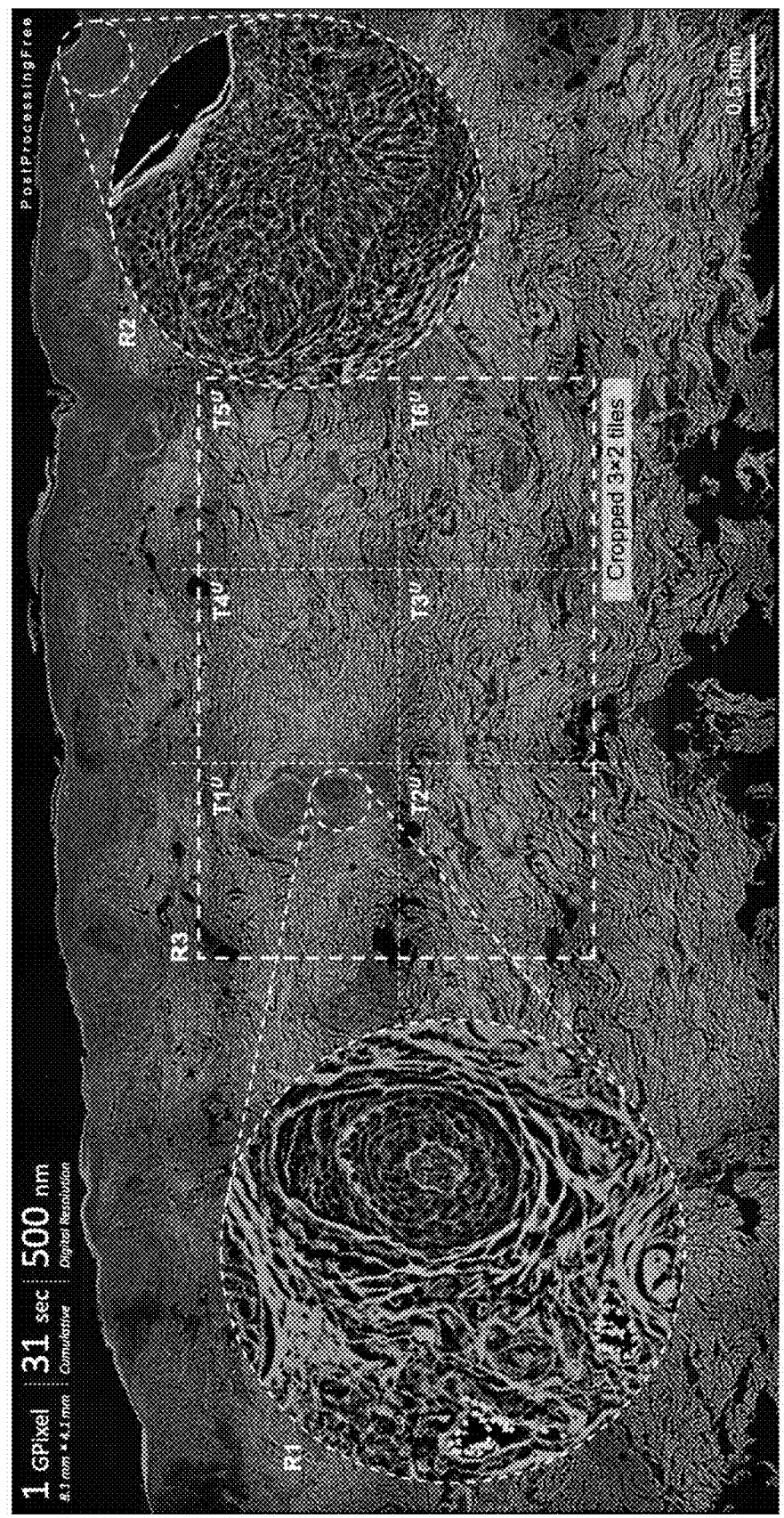
FIG. 7 is an ultra-large gigapixel-sampled color-remapped mNLOG image comprising 38,650×33,280 pixels according to one embodiment of the present disclosure.

Reference can be further made to FIG. 7, which is an ultra-large 8×4-tile gigapixel image with a scale bar of 0.5 mm, consisting of 44,470×22,609 pixels or a total of 1 Gigapixels according to one embodiment of the present disclosure. A typical hematoxylin- and eosin-stained tissue slide (superficial basal cell carcinoma) was used as a sample. Each 1.1×1.1 mm² tile comprises 6000×6000 pixels (24-bit), ensuring a pixel size of 183 nm. While dashed circular ROIs R1 and R2 reveal a high digital resolution nature. It is noted that white dashed rectangular ROI R3 comprising 3×2 distortion compensated tiles ($T1^U$-$T6^U$) was cropped and used in the A part of FIG. 6.

The ultra-large 8×4-tile gigapixel image in FIG. 7 is acquired, mosaic-stitched, and displayed in cumulative 31 seconds. No post-acquisition data processing was involved. A true effective pixel rate (EPR) of >30 M/s and an effective scanning rate (ESR) of >1 mm²/s were secured with a sustained effective throughput of >770 M bits/sec.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mesoscale nonlinear optical gigascope (mNLOG) system for centimeter-scale laser-raster-scanning of a biological specimen providing an optically-sectioned cumulative imaging area ranging from 1 square millimeter (mm) up-to 400 square mm, the mNLOG system being configured to perform a rapid artifact-compensated two-dimensional large-field mosaic-stitching (rac2D-LMS) process enabling post-processing-free gigapixel mosaic-stitching and real-time digital display, and the mNLOG system comprising:
   a scanning head including:
      a scanning mirror; and
      a galvanometer scanning mirror, wherein the scanning mirror is optically coupled to one or more pulsed laser sources, the galvanometer scanning mirror is optically coupled to the scanning mirror, the one or more laser sources are configured to generate a resonant scanning laser beam, and the scanning mirror is a resonant scanning mirror or a polygon scanning mirror;
   a first relay system including:
      a scan lens; and
      a tube lens providing a magnification factor of greater than 1, wherein the scan lens is optically coupled to the galvanometer scanning mirror, and the tube lens is optically coupled to the scan lens;
   an objective lens optically coupled to the tube lens, wherein the objective lens is used to focus the resonant scanning laser beam over the biological specimen;
   a multichannel optical detection unit, including:
      a plurality of focusing lenses;
      a plurality of dichroic beam splitters; and a plurality of receivers, wherein one or more of nonlinear multi-harmonic generation and nonlinear multi-photon excitation fluorescence signals are collected by the plurality of receivers, respectively, through the focusing lenses and the dichroic beam splitters, and the plurality of receivers are configured to generate a plurality of electrical output signals;

a multichannel data acquisition and display unit configured to receive the plurality of electrical output signals, wherein the multichannel data acquisition and display unit includes:
  a first transimpedance amplifier (TIA);
  a second TIA;
  a third TIA;
  a multichannel digitizer;
  a processing device including a computer with a central processing unit (CPU) and one or more graphics processing units (GPUs) that performs multiple C++-based algorithms stored in a memory of the computer; and
  a display device; and a motorized three-dimensional (3D) stage unit including a first electronic stage, a second electronic stage, and a third linear electronic stage that are used to bear and move the biological specimen;

wherein, in response to the rapid artifact-compensated two-dimensional large-field mosaic-stitching (rac2D-LMS) process being performed by the mNLOG system, the processing device is configured to:
  obtain a plurality of image tiles by digitizing the plurality of electrical output signals that are respectively by amplified by the first TIA, the second TIA and the third TIA and then are digitized by the multichannel digitizer, wherein each two adjacent ones of the plurality of image tiles overlap with each other;
  perform a cosinusoidal distortion correction on the plurality of image tiles to obtain a plurality of cosinusoidal distortion corrected image tiles;
  perform a pixel size calibration on the plurality of cosinusoidal distortion corrected image tiles along a first horizontal direction and a second vertical direction to obtain a plurality of pixel calibrated image tiles;
  perform a radial-distortion compensation on each of two adjacent ones of the plurality of pixel calibrated image tiles to generate a plurality of radial-distortion compensated image tiles; and
  perform a mosaic-stitching on the plurality of radial-distortion compensated image tiles to generate a mesoscale digital image of the biological specimen.

2. The mNLOG system according to claim 1, wherein the objective lens is provided with a numerical aperture (NA) that is greater than or close to 1.0.

3. The mNLOG system according to claim 1, wherein each of the receivers includes:
  an optical band-pass filter configured to filter a received optical signal; and
  a photomultiplier tube configured to convert the received optical signal into the electrical output signal.

4. The mNLOG system according to claim 1, wherein the radial-distortion compensation includes:
  using two adjacent ones of the plurality of cosinusoidal distortion corrected image tiles T1 and T2 as input image tiles, each with C×R pixels with an overlapping region of R12;

defining the angle as A, the first spatial offset as $X_{off}$, the second spatial offset as $Y_{off}$ for the input image tiles to provide with a compensating radial-distortion;

obtaining an assessment parameter $d_k$ based on a sum of absolute differences for all pixels within the overlapping region between the input image tiles and setting values of the angle, the first spatial offset and the second spatial offset corresponding to a minimum value of the assessment parameter, wherein the assessment parameter is defined as:

$$d_k = \frac{\sum_{All\ R12\ pixels} |T1^U - T2^U|}{\text{Area}(R_{12})},$$

wherein $T1^U$ and $T2^U$ are the image tiles to be applied with the compensating radial-distortion;

evaluating a first mathematical expression according to a field of view (FOV) distortion model:

$$r_d(x, y) = \frac{360}{A\pi} \tan^{-1}\left[2r_u(x, y)\tan\frac{A\pi}{720}\right]; \text{ wherein}$$

$$r_u(x, y) = \sqrt{r_x(x, y)^2 + r_y(x, y)^2},$$

$$r_x(x, y) = \frac{1}{c_1}(F_x(x, y) - c_1),$$

$$r_y(x, y) = \frac{1}{c_2}(F_y(x, y) - c_2),$$

$$c_1 = 0.5C(1.0 + X_{off}/S_x),$$

$$c_2 = 0.5C(1.0 + Y_{off}/S_y),$$

$$F_x(x, y) = \begin{pmatrix} 0 & \cdots & C-1 \\ \vdots & \ddots & \vdots \\ 0 & \cdots & C-1 \end{pmatrix}_{C \times R}, \text{ and}$$

$$F_y(x, y) = \begin{pmatrix} 0 & \cdots & 0 \\ \vdots & \ddots & \vdots \\ R-1 & \cdots & R-1 \end{pmatrix}_{C \times R};$$

evaluating a multiplicative factor f(x, y) for a pincushion distortion or a barrel distortion, wherein the multiplicative factor f(x, y) is defined as $r_u(x, y)/r_d(x, y)$ for the pincushion distortion, or defined as $r_d(x, y)/r_u(x, y)$ otherwise;

calculating two pixel-coordinate maps for the first horizontal direction and the second vertical direction, wherein the two pixel-coordinate maps are defined as:

$$M_x(x,y) = C_1[1 + r_x(x,y)f(x,y)] \text{ and}$$

$$M_y(x,y) = C_2[1 + r_y(x,y)f(x,y)]; \text{ and}$$

performing pixel remapping as per the two pixel-coordinate maps for the input image tiles to obtain two adjacent ones of the plurality of radial-distortion compensated image tiles.

5. The mNLOG system according to claim 4, wherein the radial-distortion compensation further includes:
  converting the input image tiles to 8-bit grayscale format;
  performing a morphological opening operation on each of the input image tiles; and
  applying a binary thresholding on the input image tiles.

6. The mNLOG system according to claim 1, wherein the mosaic-stitching includes:
  sliding a to-be-aligned image tile along the first horizontal direction and the second vertical direction toward at least one existing image tile of the plurality of radial-distortion compensated image tiles, so as to obtain a plurality of overlapping regions of interests (ROIs) between the to-be-aligned image tile and the at least one existing image tile based on a motion of the motorized 3D stage;

comparing the overlapping ROIs to the to-be-aligned image tile and the at least one existing image tile, so as to identify one or more major overlapping ROIs;

performing a cross-correlation operation between the to-be-aligned image tile and the at least one existing image tile according to the one or more major overlapping ROIs and for each ROI a per-pixel absolute difference is calculated for each pixel and a standard deviation is calculated; and placing the to-be-aligned image tile over the at least one existing image tile wherein the standard deviation is found to be minimum.

\* \* \* \* \*